April 26, 1960

J. S. KAMBORIAN 2,933,742

REPLACEABLE WIPER FOR TOE LASTING MACHINE

Filed March 11, 1958

Inventor
Jacob S. Kamborian
by Roberts, Cushman & Grover
Attorneys

United States Patent Office 2,933,742
Patented Apr. 26, 1960

2,933,742

REPLACEABLE WIPER FOR TOE LASTING MACHINE

Jacob S. Kamborian, West Newton, Mass.

Application March 11, 1958, Serial No. 720,681

5 Claims. (Cl. 12—12.4)

This invention relates to shoe machinery and more especially to machines for lasting the ends of shoes.

In pending application Serial No. 579,042, filed April 18, 1956, there is shown a machine for lasting the toe of a shoe which is provided with a pair of primary wipers arranged to be advanced toward the toe, parallel to the bottom of the shoe, to wipe the lasting margin inwardly over the bottom and a subjacent secondary heated wiper which is arranged to be moved forwardly beneath the primary wipers after the latter have been withdrawn and to be manipulated in conjunction with lasting pinches to redistribute the inwardly lasted margin and iron it down as flat as possible. The secondary heated wiper has a forwardly facing recess which is substantially the converse of the toe of the shoe and is dimensioned according to the shoe size and it is the primary object of this invention to provide a mounting for the secondary wiper which will make it possible for the operator to quickly and easily replace a wiper of one size for that of another according to the shoe being operated upon, without having to dismantle the machine or any of its parts.

As herein illustrated the machine has at its top a hollow cap which provides a supporting housing for primary and secondary wipers mounted therein for movement in planes parallel to the shoe bottom. The wipers and their operating mechanism are concealed within the cap by a cover plate fastened thereto which nevertheless may be removed to afford access to the wipers. Reciprocation of the secondary wiper is effected by a slide to which it is connected, the slide being mounted within the cap for sliding movement forwardly and rearwardly. In accordance with the invention the secondary wiper is connected to its slide by means which is operably accessible when the primary wipers have been retracted without removal of the primary wipers or the overlying structure to release the secondary wiper from its support and hence to permit it to be withdrawn and conversely to permit a replacement to be made. The means for connecting the secondary wiper to its support is a pin mounted on the support with its upper end engaged within an opening in the rear end of the secondary wiper. There is means yieldably holding the pin engaged with the wiper. Disengagement may be effected by pressure applied to the upper end of the pin through an aperture in the cap which is located so as to be in registration with the upper end of the pin when the wiper support is advanced.

The wiper is hollow and contains a heating element; accordingly mating coupling elements are mounted on the support and the wiper respectively, for interengagement to connect the heating element of the wiper to a source of power when the wiper is secured in place, but which may be disengaged when the wiper is released solely by sliding the wiper out of place.

The invention will now be described in greater detail with reference to the accompanying drawings wherein.

Figure 1:
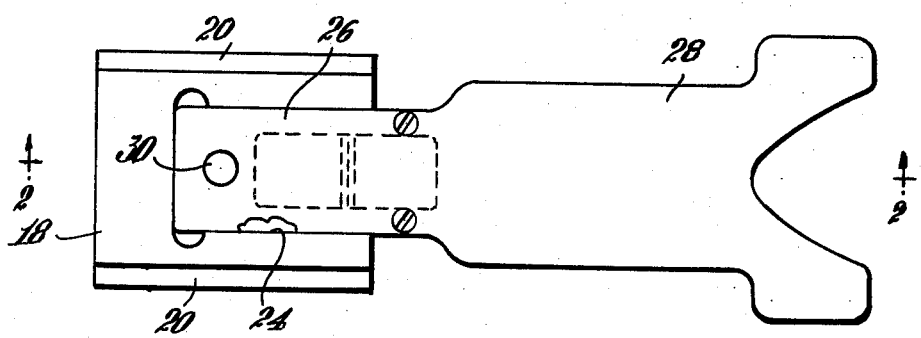
Fig. 1 is a plan view of the wiper and its slide.

This invention is concerned with a secondary heated wiper, such as shown in application Serial No. 579,042, filed April 18, 1956, the details of the machine itself being more fully shown in pending application Serial No. 630,135, filed December 24, 1956. In that machine there is a hollow base which supports at its upper end, for horizontal movement, a pair of wipers 10, only one of which is shown herein, and actuators 12 therefor. The primary wipers and actuators are contained within a cap 8 at the top of a base 6, the cap having a cover plate 14 fastened over it to conceal the wipers and their actuators. Below the primary wipers the base has at opposite sides horizontally disposed tracks 16 for supporting a slide 18 for movement beneath the primary wipers, the latter having ribs 20 at its opposite sides for engagement with the tracks 16 and means 22 extending rearwardly therefrom for connection to a source of power for effecting reciprocation of the slide 18. The top of the slide has a recess 24 milled in it for receiving the shank 26 of a secondary heated wiper 28. The wiper, as therein shown, is connected to the slide by a pin screwed into the slide with its head engaged within an aperture at the rear end of the shank. As thus constructed, each time it was necessary to change the wiper for a different size shoe the cover plate 14 had to be removed, followed by removal of the primary wipers and their operating mechanism to afford access to the screw for the purpose of removing it and thereby releasing the wiper. Thus the machine had to be shut down until the shop mechanic had time to make the change.

The present construction is for the purpose of making it possible for the operator to remove and replace the secondary wiper quickly and easily with a minimum delay in production and without requiring the assistance of a mechanic. To this end the slide 18 has drilled through it, from top to bottom, a vertically disposed hole 32, the lower part of which is countersunk at 34, for slidably receiving a pin 36, the upper end of which is arranged to project into an aperture 30 in the shank of the wiper and thus to connect the wiper to the slide for movement therewith. The pin 36 has a collar 38 which, by engagement with the bottom of the countersink 34, limits the position of the upper end of the pin so that it is flush with the upper surface of the wiper and which provides an abutment for one end of a spring 40 surrounding the lower end of the pin which yieldably holds the pin in its upper position by engagement of its opposite end with a plate 42 fastened to the slide over the countersink. As thus arranged the pin is downwardly displaceable to disengage its upper end from the wiper, thereby to release it and to permit it to be withdrawn from between the confining parts, namely the slide, the overlying primary wipers, operating mechanism and the cover plate.

Figure 2:
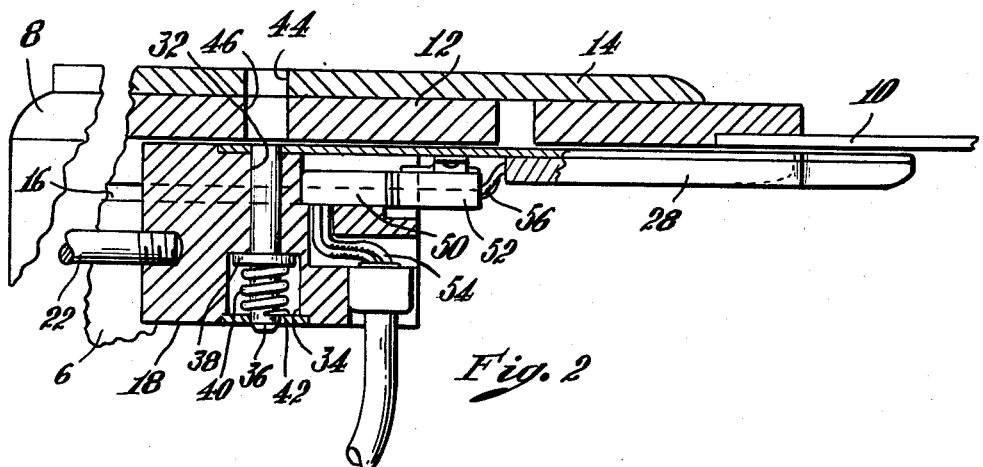
Fig. 2 is a vertical section taken on the line 2—2 of Fig. 1, showing the wiper and the means connecting it to the slide and the overlying primary wipers.
Figure 3:
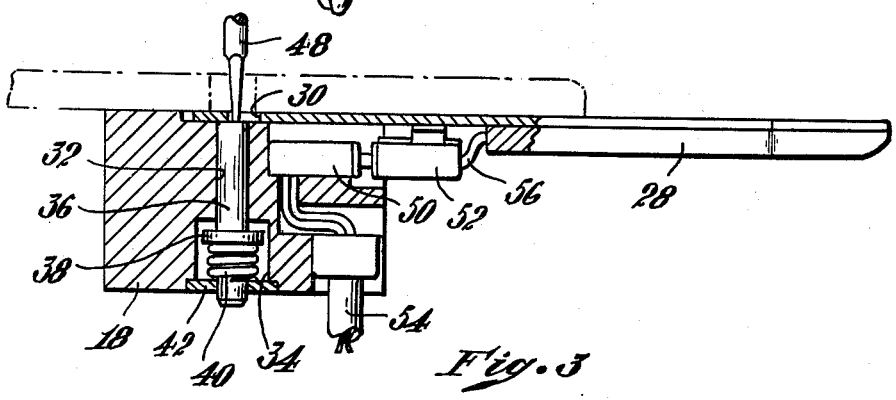
Fig. 3 is a corresponding section showing the pin depressed by an implement presented through the opening in the cover.

To effect displacement of the pin the cover plate 14 and wiper operating mechanism have aligned apertures 44 and 46 (Fig. 2), so located as to be in registration with the upper end of the pin 32 when the primary wipers are fully retracted and the secondary wiper is fully advanced. Provision of the aforesaid apertures permits an implement 48 (Fig. 3) to be inserted through the overlying structure into engagement with the upper end of the pin to depress the same and to force the same out of engagement with the aperture in the secondary wiper, so that the latter may be drawn forwardly, as shown in Fig. 3, and removed. When a different wiper is to be inserted the pin is again displaced by pressure of the implement against its upper end to permit inserting of the end of the shank between the upper end of the pin and the underside of the overlying structure.

As previously indicated, the wiper is heated and, as shown in the application referred to, is hollow and contains a heating element. To make possible the replacement of one wiper for another quickly and easily without having to disconnect the electric wires, male and female coupling elements 50 and 52 are mounted on the slide 18 and the shank 26 of the wiper so as to be interengaged when the wiper is locked in place by the pin 32. Release of the wiper and forward movement in a horizontal plane will separate the mating elements, and conversely, movement of the wiper into place will interengage the elements. The element 50 is connected by suitable flexible conductors 54 to an outside source of electric power and the element 52 is connected by suitable flexible conductors 56 to the element within the wiper.

It should be understood that the present disclosure is for the purpose of illustration only and that this invention includes all modifications and equivalents which fall within the scope of the appended claims.

I claim:

1. In a toe lasting machine having primary wipers and means for effecting movement thereof, a support mounting the primary wipers and operating mechanism including a cover overlying the wipers and concealing the operating mechanism, a secondary wiper, a slide mounting the secondary wiper on the support for movement beneath the primary wipers, said secondary wiper being confined between the primary wiper and the slide but being slidable forwardly from between them when free, and means on the slide having a part interengaged with the secondary wiper and holding the same for movement with the slide, said means being accessible through the cover for movement to disengage it from the secondary wiper without dismantling the confining parts.

2. In a toe lasting machine having primary wipers and means for effecting movement thereof, a support mounting the primary wipers and operating mechanism including a cover overlying the wipers and concealing the operating mechanism, a secondary wiper having at its rear end an aperture, a slide mounting the secondary wiper for movement beneath the primary wipers, said secondary wiper being confined between the primary wipers and the slide but being slidable forwardly from between them when free, and a pin yieldably mounted on the slide with an end engaged with said aperture, said pin being displaceable to disengage it from the secondary wiper, and said cover containing an aperture through which an implement may be inserted to depress the pin out of engagement with the aperture in the secondary wiper.

3. In a toe lasting machine having primary wipers and means for effecting movement thereof, a support mounting the primary wipers and operating mechanism including a cover overlying the wipers and concealing the operating mechanism, a secondary wiper having at its rear end an aperture, a slide mounting the secondary wiper for movement beneath the primary wipers, said secondary wiper being confined between the primary wipers and the slide, a pin mounted on the slide with an end of it engaged with said aperture, means yieldably holding the pin engaged within the aperture, said pin being depressible to disengage it from the aperture, said overlying structure containing an aperture with which the end of the pin is aligned when the secondary wiper is in its advanced position through which an implement may be thrust to disengage the pin from the aperture.

4. In a toe lasting machine having primary wipers and means for effecting movement thereof, a support mounting the primary wipers and operating mechanism, a secondary wiper having an aperture in a portion rearwardly of its leading edge, a slide mounting the secondary wiper for movement beneath the primary wipers, said secondary wiper being confined between the primary wipers and the slide but being slidable forwardly from between them when free, a pin mounted on the slide at right angles to the plane of the secondary wiper, with its upper end engaged within said aperture for connecting the secondary wiper to the slide, yieldable means holding the pin engaged within the aperture, said pin being depressible to permit the latter to be withdrawn and said overlying structure containing an aperture through it situated in registration with the upper end of the pin when the secondary wiper is in is advanced position through which an implement may be thrust to depress the pin.

5. In a toe lasting machine having primary wipers and means for effecting movement thereof, a support mounting the primary wipers and operating mechanism, a secondary wiper having an aperture rearwardly of its leading edge, a slide mounting the secondary wiper for movement beneath the primary wipers, said secondary wiper being confined between the primary wipers and the slide but being slidable forwardly between them when free, a pin carried by the slide having an end engaged within the aperture in the wiper, said pin connecting the secondary wiper to the slide, and means yieldably supporting the pin with its end engaged within the aperture, said overlying structure having an aperture through it situated in a position vertically above the pin when the secondary wiper is in its advanced position through which an implement may be inserted to depress the pin out of engagement with the aperture to release the secondary wiper.

References Cited in the file of this patent

UNITED STATES PATENTS

| | | |
|---|---|---|
| 1,717,928 | Kauf | June 18, 1929 |
| 1,729,683 | Pym | Oct. 1, 1929 |
| 2,210,586 | Kamborian | Aug. 6, 1940 |
| 2,446,330 | Holmgren | Aug. 3, 1948 |
| 2,505,134 | Miller | Apr. 25, 1950 |